Figure 1:
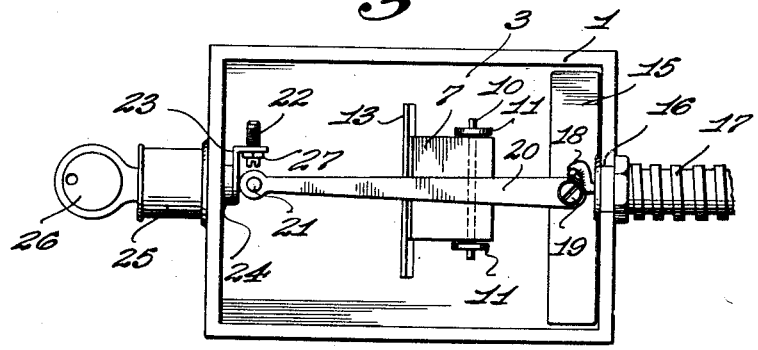

May 12, 1942.  O. M. KNIGHT ET AL  2,282,366
SPEED CONTROLLING DEVICE FOR MOTOR VEHICLES
Filed April 23, 1940  3 Sheets-Sheet 1

Inventor
Oliph M. Knight
Warren C. LeMire
By Lacey & Lacey,
Attorneys

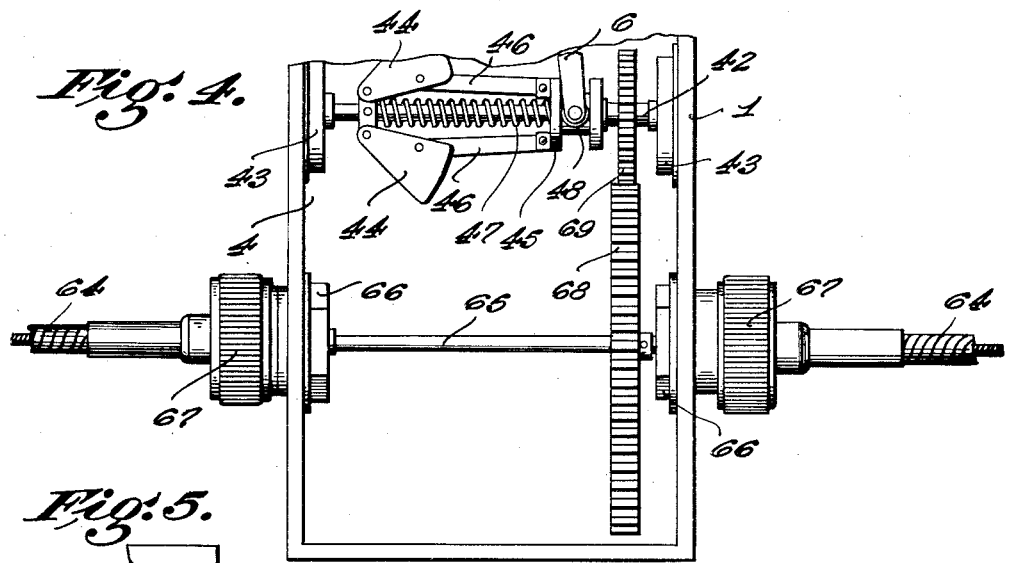
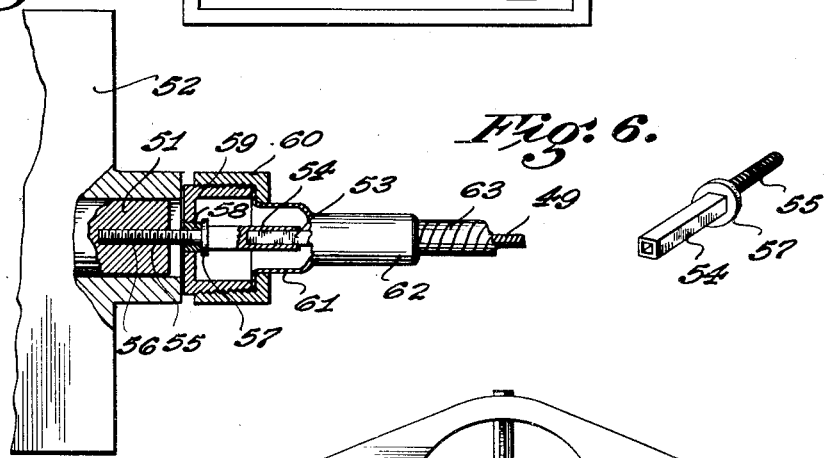
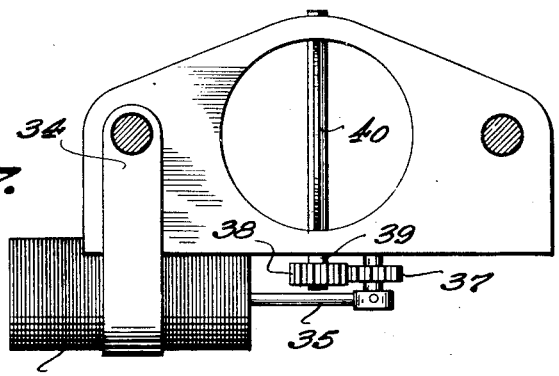

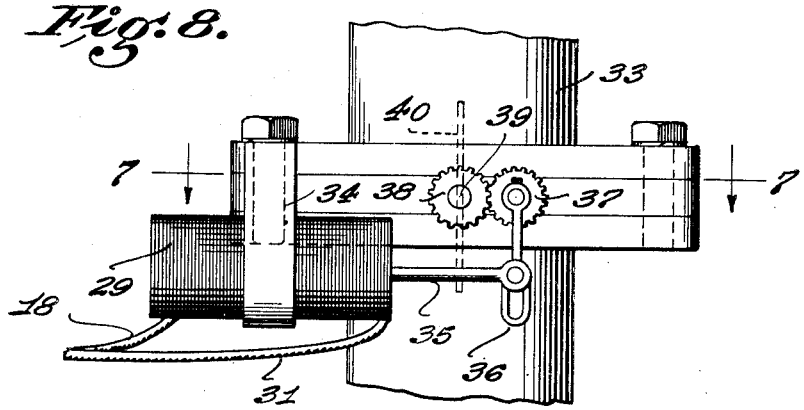
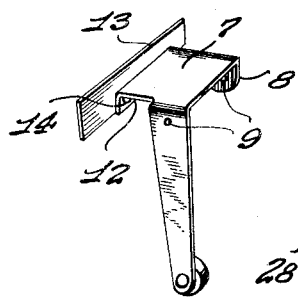
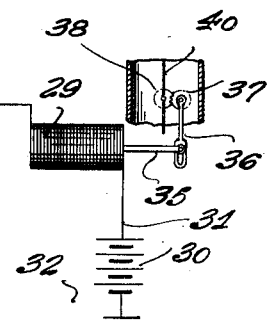
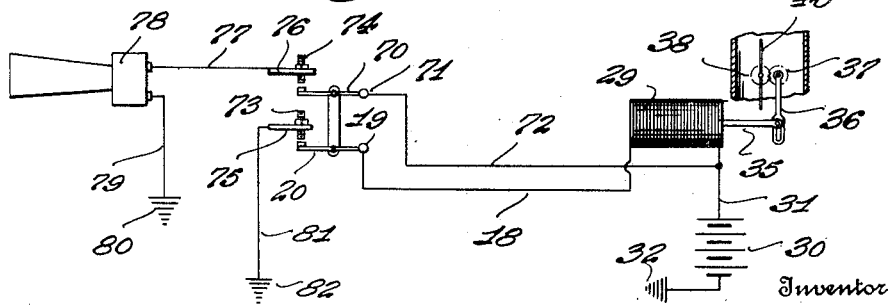

Patented May 12, 1942

2,282,366

UNITED STATES PATENT OFFICE 2,282,366

SPEED-CONTROLLING DEVICE FOR MOTOR VEHICLES

Oliph M. Knight, Chicago, Ill., and Warren C. Le Mire, Miami, Fla.

Application April 23, 1940, Serial No. 331,236

6 Claims. (Cl. 200—80)

This invention relates to a speed-controlling device for motor vehicles, and it is one object of the invention to provide a device of this character which may be easily installed and serve very effectively to prevent a motor vehicle from being driven beyond a predetermined speed, when properly adjusted.

Another object of the invention is to so form the device that it may be driven directly from the shaft of the generator of the motor vehicle or from the speedometer shaft. It will thus be seen that the governor may be responsive to the R. P. M. speed of the generator shaft or responsive to the rolling speed of the motor vehicle.

Another object of the invention is to provide a speed-controlling device of such construction that, as the speed of a motor vehicle advances, a horn serving as an audible signal may first be energized by closing a circuit through the same for indicating to the driver that the speed limit permitted by the device is being closely approached, a second circuit being then closed to energize a solenoid and cause a valve to be closed for shutting off flow of fuel to the engine of the vehicle.

Another object of the invention is to provide a speed-controlling device wherein movable contacts for switches of the two circuits are both actuated by a crosshead or strip of insulating material carried by a lever pivotally mounted in a casing and operatively engaged with the collar of a weighted governor which has movement imparted to it in response to variations in speed.

Another object of the invention is to provide a device of this character wherein a contact for engagement by the lever actuated contact is carried by the core of a lock and movable therewith into and out of position for engagement by the lever actuated contact. It will thus be seen that the owner of the motor vehicle may operate the lock to set the contact carried thereby in position for engagement by the lever actuated contact and prevent the vehicle from being driven above a predetermined speed or may operate the lock to move its contact out of position for engagement by the lever actuated contact and allow the vehicle to be driven at higher speeds.

Another object of the invention is to provide an improved coupling for connecting the flexible drive shaft of the device to the shaft of the generator, the coupling being so constructed that it may be easily applied to the generator shaft and firmly hold the flexible drive shaft in operative connection therewith.

Figure 2:
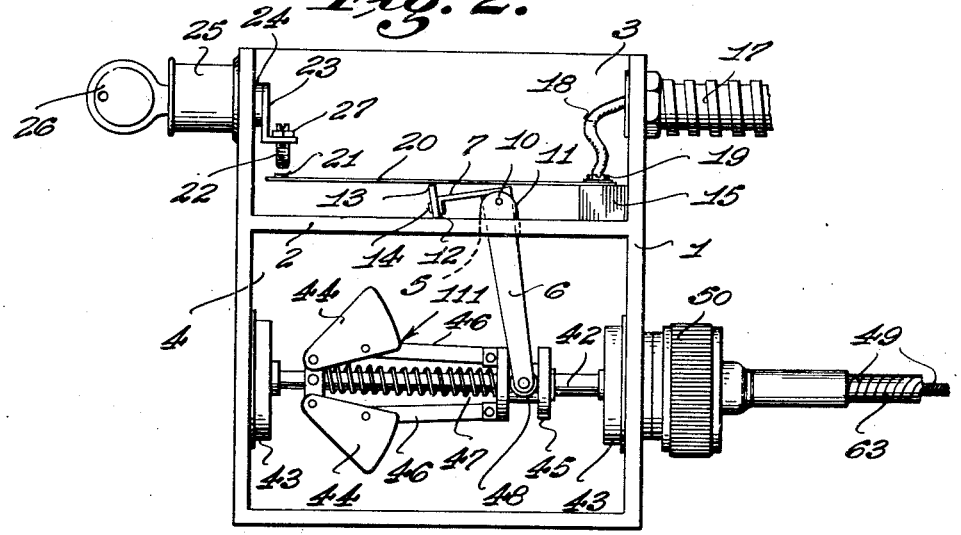
Figure 3:
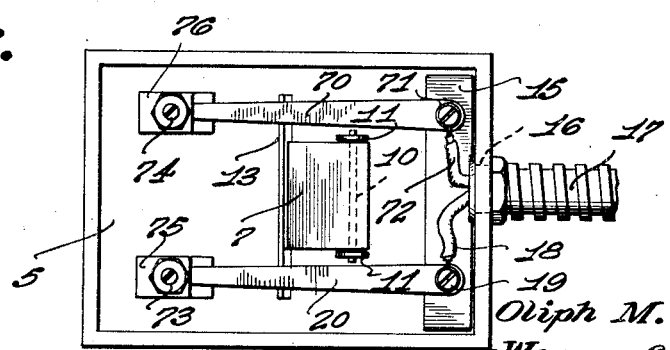

The invention is illustrated in the accompanying drawings, wherein:

Figure 1 is a view showing the improved speed-controlling device in top plan, the closure plate being removed, Figure 2 is a side elevation of the speed-controlling device with the closure plate removed, the contact carried by the lock being moved into position for engagement by the lever actuated contact, Figure 3 is a top plan view showing a speed-controlling device provided with a pair of stationary and movable contacts, Figure 4 is a fragmentary view in side elevation of a modified drive for the governor of the device, Figure 5 is a view partially in section and partially in elevation of a coupling connecting the flexible drive shaft of the device with the generator of a motor vehicle, Figure 6 is a perspective view of a stem forming an element of the coupling illustrated in Figure 5, Figure 7 is a view taken along the line 7—7 of Figure 8 showing a solenoid operatively mounted in position for closing the fuel valve of a motor, Figure 8 is a side elevation of Figure 7, Figure 9 is a diagram of the circuit for Figure 1, Figure 10 is a diagram of the circuit for Figure 3, and Figure 11 is a perspective view of the lever for actuating the resilient contact of Figure 1 or the pair of resilient contacts of Figure 3.

This improved speed-controlling device has a casing 1 which is formed of metal or other suitable material and is open at its top and along one side, the open top and side being normally closed by a closure plate detachably secured to the casing by screws or in any other desired manner. A partition 2 extends horizontally in the casing and divides the same into an upper chamber 3 and a lower chamber 4, an opening 5 being formed in the partition so that a lever 6 may extend through the partition into the lower chamber. This lever has its upper end formed integral with one side of a rocker plate 7 carrying a depending ear 8 at its other side, the ear and the lever being formed with alined openings 9 through which a pin 10 passes to pivotally mount the plate and the lever between ears 11 extending upwardly from the partition. The free end portion of the plate 7 is bent downwardly to form a flange 12 extending transversely thereof and to which a strip 13 of insulating material is secured by rivets or other suitable fasteners 14. The bridge or strip of insulating material is of such length that its end portions project from opposite sides of the rocker plate and the strip is of such depth that it projects upwardly from the plate.

At one end of the chamber 3 is a block 15 formed of insulation and extending the full width of the chamber. This block rests upon the partition and over the block the adjacent end wall of the casing is formed with an opening 16 through which is secured an electric cable 17, the wire 18 of which is engaged with a terminal screw 19, by means of which an elongated contact 20 formed of resilient metal is secured to the block 15. The movable contact 20 extends longitudinally in the chamber 3 and at its free end carries an upwardly projecting contact point 21 which is intended to engage a companion contact point 22 carried by a bracket 23. This bracket 23 is fixed to the inner end of the barrel or core 24 of a lock 25 mounted through the other end wall of the casing 1, and by comparing Figure 1 with Figure 2, it will be readily seen that, when the core of the lock is in the position shown in Figure 1, the contact 22 will be out of position for engagement by the contact point 21, whereas when the core of the lock is turned by the key 26 to the position shown in Figure 2, the contact 22 will be located directly over the contact 21 for engagement thereby when the contact strip 20 is shifted upwardly by movement of the lever 6 in a direction to swing the plate 7 and the strip 13 upwardly. By adjusting the threaded contact 22 and then securing it in a set position by the nut 27 the distance the movable contact strip 20 must be flexed upwardly to close a circuit may be regulated.

Referring to Figure 9, it will be seen that the lock is grounded, as shown at 28, and the wire 18 leads from one end of a solenoid 29 which has its other end connected with a battery 30 by a wire 31, the battery being grounded, as shown at 32, so that, when the circuit is closed by movement of the movable contact into engagement with the relatively stationary but adjustable contact 22, current will flow through the solenoid and energize the same. The solenoid is secured to the fuel pipe 33 or inlet manifold of an internal combustion engine, as shown in Figures 7 and 8, by a suitable strap or bracket 34 and, when the solenoid is energized, its core 35 will be retracted and exert pull upon a handle 36 and rotate a gear 37 which meshes with a second gear 38 carried by the shaft or stem 39 of a butterfly valve 40 and move the valve to a closed position. Flow of fuel will thus be cut off and operation of the engine halted and the motor vehicle driven thereby brought to a stop.

In order to actuate the lever 6, there has been provided a governor 41 having a shaft 42 extending longitudinally in the chamber 4 and rotatably mounted in bearings 43 carried by end walls of the casing. Weights 44 are pivoted to a collar 45 rigidly fixed to the shaft adjacent one end thereof and these weights are connected with a slidable collar 45 by links 46. A spring 47 which is coiled about the shaft yieldably holds the collar 45 in its normal position, shown in Figure 2, with the weights adjacent the shaft and, when the shaft is rotated, centrifugal force swings the weights outwardly so that they exert pull upon the links 46 and draw the collar 45 along the shaft. The collar 45 is formed with a circumferentially extending groove to receive the free end portion of the lever 6 and the roller 48 carried thereby, and when this collar is shifted along the shaft, the lever will be tilted about the pin 10 and the rocker plate 7 and the strip of insulation 13 carried thereby will be swung upwardly to raise the resilient contact strip 20 and close the circuit if the stationary contact is disposed over the free end of the movable contact.

The shaft 42 has rotary motion transmitted to it by a flexible shaft 49 connected with the shaft 42 by a coupling 50 of conventional construction, and when the speed increases beyond a predetermined point, the circuit will be closed to energize the solenoid and cause the valve 40 to be closed. By adjusting the contact 22, the speed at which the circuit is to be closed may be regulated. When the lock is actuated to turn the bracket 23 and the contact 22 to one side of the contact 20, as shown in Figure 1, the vehicle may be driven at increased speed without the circuit being closed and the valve shut. The other end of the flexible shaft 49 may be connected with the shaft 51 of the generator 52, as shown in Figure 5, and the shaft 42 thus driven from the generator shaft. Referring to Figure 5, it will be seen that the shaft 49 has a squared end 53 to fit within a socket 54. This socket has a threaded stem or shank 55 screwed into a threaded socket 55 formed in the generator shaft 51, and about the shank is formed a collar 57 bearing against a bearing sleeve or bushing 58 mounted in the head of a coupling member 59. This coupling member is cup-shaped and has an externally threaded annular wall for engagement by the internally threaded coupling member 60 which fits loosely about the flared end portion 61 of the terminal 62 at the end of the flexible shaft casing 63. When the generator shaft is rotating, the socket 54 will turn with it and rotary motion imparted to the flexible shaft which transmits rotary motion to the shaft 42 of the governor. It will be understood that a coupling of the construction illustrated in Figure 5 may be provided for connecting the flexible shaft with the governor shaft if so desired.

Instead of connecting the governor shaft with the generator shaft, rotary motion may be transmitted to it from the speedometer shaft, as shown in Figure 4, and the circuit through the solenoid closed in response to variations in the "rolling" speed of the motor vehicle instead of in response to variations in the speed of the generator shaft. In this embodiment of the invention, the casing 1 is of increased depth and in the lower portion of the chamber 4 is disposed a shaft 65 rotatably mounted in bearings 66. The speedometer shaft 64 extends from one wheel of the vehicle to a speedometer of a conventional construction, and in spaced relation to the speedometer a portion of the shaft is removed to accommodate the speed-controlling device. The severed ends of the speedometer shaft are connected with the shaft 65 by couplings 67 which may be of a conventional construction or of the construction illustrated in Figure 5, and when the vehicle is in motion, the shaft 65 will be turned with the speedometer shaft and rotary motion transmitted to the shaft by a large gear 68 carried by the shaft 65 and meshing with a smaller gear 69 carried by the shaft 42. By this arrangement, the shaft 42 will be rotated at a higher rate of speed than the speedometer shaft, and when the speedometer registers a speed higher than a predetermined speed, the resilient contact strip 20 will be shifted upwardly to close the circuit and the solenoid will be energized to move the valve 40 to a closed position and shut off flow of fuel to the motor. It will thus be seen that the speed-controlling device may be driven either from the speedometer shaft or from the generator shaft and flow of fuel to the motor shut off when the speed at which a vehicle is moving exceeds a predetermined rate.

In Figures 3 and 10, there has been shown a modified construction, wherein a signal is first energized and the circuit through the solenoid then closed if the driver of the vehicle does not reduce the speed when warned by the signal. In this embodiment of the invention, the block 15 of insulation not only carries a resilient contact strip 20 but also a second resilient contact strip 70 which is secured to the block by a screw 71. A second wire 72 passes through the cable 17 and has one end engaged with the screw 71 and its other end connected with the wire 31 so that current may flow from the battery 30 through the wires 31 and 72 to the contact strip 70. The free ends of the movable contact strips extend under stationary contacts 73 and 74 threaded through brackets 75 and 76, and by properly adjusting the stationary contacts, the contact strip 70 may be caused to engage the contact 74 a short time after the contact 20 engages the contact 73 when the lever 6 is actuated to swing the plate 7 and the strip 13 upwardly to bring the upper edge of the strip 13 into engagement with the resilient contact strips and flex them upwardly. During this upward movement, the strip 70 first engages the contact 74 so that current flows through wire 77 to a horn 78 or equivalent signaling device, such as a light or bell, and through wire 79 which is grounded, as shown at 80, and the contact strip 70 is then bent upwardly until the strip 20 engages the contact 73 and closes the circuit through the solenoid so that current may flow through the solenoid and back to the battery by way of the wire 81 leading from the bracket 75 and grounded, as shown at 82. It will thus be seen that, when a person is driving a motor vehicle equipped with the improved speed-controlling device, he may set the contacts 73 and 74 for predetermined speeds and when the speed is approaching the speed allowed by law, the horn will be sounded, after which the solenoid will be energized to shut off flow of fuel to the engine if the driver ignores the signal and attempts to drive a too high a rate of speed.

Having thus described the invention, what is claimed as new is:

1. In a speed-controlling device for motor vehicles, a casing, a movable contact in said casing, a lock mounted through a wall of the casing and extending longitudinally of the movable contact and having a rotatable core adapted to be turned by a key and having its inner end exposed within the casing, a bracket carried by the inner end of said core and extending laterally therefrom and terminating in a free end portion extending away from the core longitudinally of the core and of the movable contact, a contact carried by the free end portion of said bracket radially of the core and movable with the bracket from an inoperative position at one side of the movable contact to an operative position over the movable contact when the core is turned in one direction, the second contact being adjustable longitudinally of itself through the free end portion of the bracket in a direction radially of the core to a position disposing its inner end in predetermined spaced relation to the movable contact when over the same, a lever in said casing for engaging the movable contact and shifting the same towards the second contact, and means for actuating said lever adapted to be actuated in response to variations in the speed at which a motor vehicle is moving.

2. In a speed-controlling device for motor vehicles, a casing, a movable contact in said casing, a lock mounted through a wall of the casing and having a rotatable core adapted to be turned by a key and having its inner end exposed within the casing, a bracket carried by the inner end of said core and extending laterally therefrom, a contact carried by said bracket and movable with the bracket from a position at one side of the movable contact to an operative position over the movable contact when the core is turned in one direction, the second contact being threaded through the bracket for movement to a position in predetermined speed relation to the movable contact when over the same, a lever pivotally mounted in said casing under the movable contact, a head for said lever, a strip of insulation carried by said head transversely thereof for engaging the under face of the movable contact and forcing the same upwardly into position for engaging the second contact when the lever is moved in one direction, a rotary governor in said casing engaging said lever, and a shaft for transmitting rotary motion to said governor from a rotatable element of a motor vehicle.

3. In a speed-controlling device for motor vehicles, a casing, a partition dividing said casing into upper and lower chambers, a block of insulation in the upper chamber, a strip of resilient metal in the upper chamber constituting a movable contact, a terminal screw securing one end of said contact strip to the block of insulation, a stationary contact in the upper chamber over the free end of the movable contact, a lever extending through said partition and at its upper end being pivotally mounted in the upper chamber, a rocker plate carried by the upper end of said lever, a strip of insulation carried by said rocker plate and extending transversely thereof under the movable contact, a governor in the lower chamber operatively engaging the lower end of said lever, and means for transmitting rotary motion to said governor in response to variations in the speed at which a motor vehicle is moving.

4. In a speed-controlling device for motor vehicles, a casing, a partition dividing said casing into upper and lower chambers, a block of insulation in the upper chamber, a strip of resilient metal in the upper chamber constituting a movable contact, a terminal screw securing one end of said contact strip to the block of insulation, a second contact in the upper chamber, key controlled means mounting the second contact for movement from an inoperative position to an operative position over the free end of the movable contact, ears extending upwardly from said partition, a plate pivotally mounted between said ears and having a depending lever extending through the partition into the lower chamber, a strip of insulation carried by said plate and extending under the movable contact for engagement with the under face thereof, and a speed responsive governor mounted in the lower chamber and operatively engaging said lever to tilt the lever in response to variations in speed and swing the plate upwardly to flex the resilient movable contact upwardly into engagement with the second contact and close a circuit.

5. In a speed-controlling device for motor vehicles, a casing, a partition in said casing dividing the casing into upper and lower chambers, a block of insulation in said upper chamber mounted upon said partition at one end thereof, stationary contacts carried by said partition in insulated relation to each other and spaced from each other transversely of the partition, strips of resilient metal secured to said block in spaced relation to each other and constituting movable contacts extending longitudinally in said upper chamber with their free ends disposed under the stationary contacts, ears extending upwardly from said partition between the movable contacts, a plate pivotally mounted between said ears and having a lever at one side extending downwardly through the partition into the lower chamber, a strip of insulation carried by the free end of said plate with portions projecting from opposite sides of the plate and under the movable contacts to flex the movable contacts upwardly into engagement with the stationary contacts when the lever is moved in one direction, and a speed-responsive governor in the lower chamber engaging said lever to move the lever in response to variations in the speed at which a motor vehicle is traveling.

6. In a speed-controlling device for motor vehicles, a casing, a stationary contact in said casing, a movable contact in said casing extending under the stationary contact and movable towards the same to engage the stationary contact and close a circuit, a second stationary contact in said casing, a second movable contact in the casing extending under the second stationary contact and movable towards the same to engage the second stationary contact and close a circuit, the stationary contacts being adjustable to positions in predetermined spaced relation to the movable contacts, a lever pivotally mounted in said casing, a head for said lever, a strip of insulation carried by the head of said lever and extending under the movable contacts for engaging the same and flexing the movable contacts towards the stationary contacts and closing the circuits when the lever is moved in one direction, and a speed responsive governor in said casing operatively engaged with said lever.

OLIPH M. KNIGHT.
WARREN C. LE MIRE.